Figure 1:
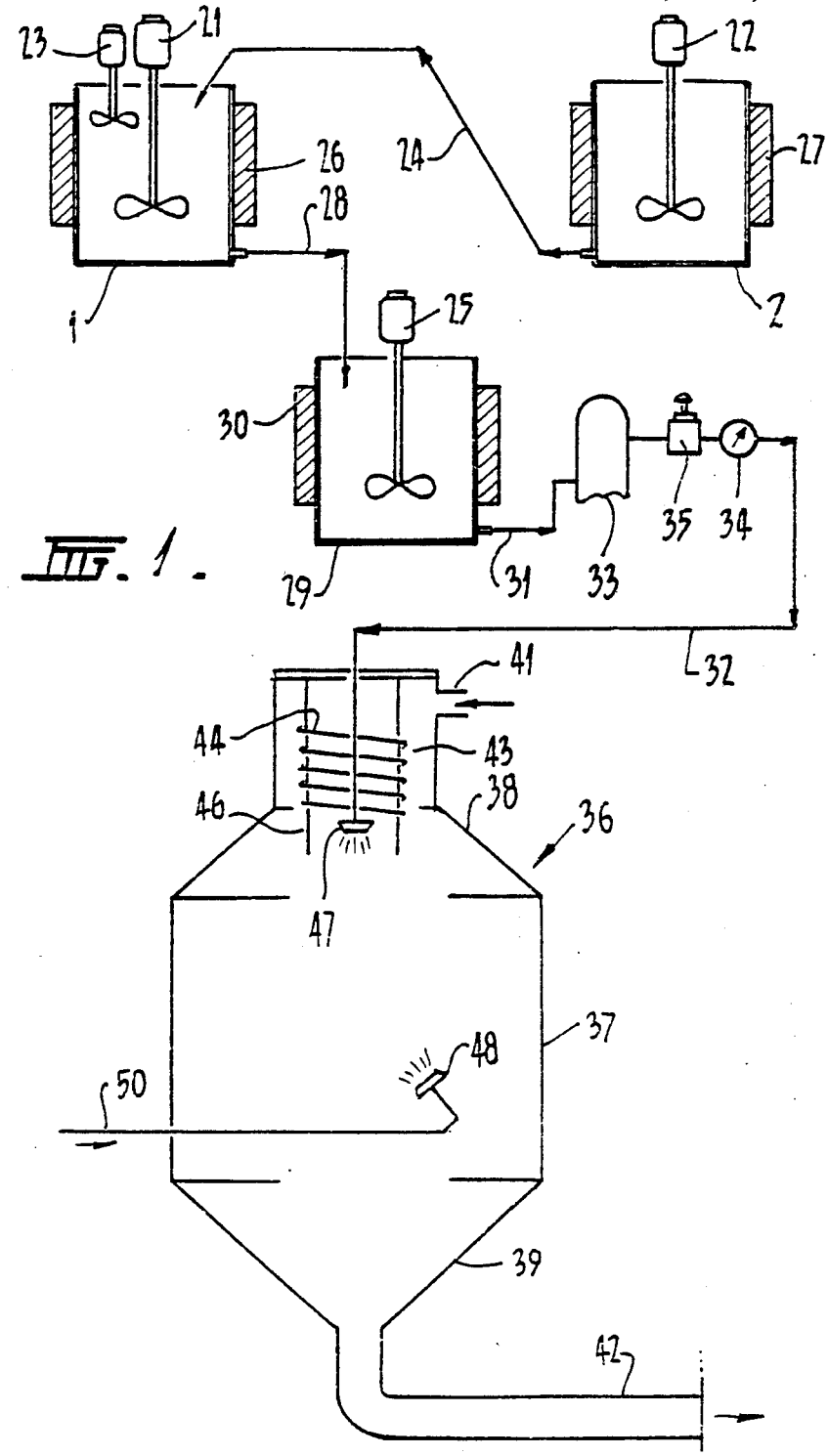

United States Patent [19]

Baker et al.

[11] Patent Number: 4,549,892

[45] Date of Patent: Oct. 29, 1985

[54] PROCESS FOR PRODUCING HOLLOW, BILAYERED SILICATE MICROSPHERES

[76] Inventors: Alfred G. Baker; Andrew J. Baker, both of 41 Myrtle St., Glen Waverley, Victoria 3150, Australia

[21] Appl. No.: 506,649

[22] PCT Filed: Sep. 22, 1982

[86] PCT No.: PCT/AU82/00160

§ 371 Date: May 23, 1983

§ 102(e) Date: May 23, 1983

[87] PCT Pub. No.: WO83/01068

PCT Pub. Date: Mar. 31, 1983

[51] Int. Cl.[4] .................... B32B 5/16; C03B 19/10
[52] U.S. Cl. ........................ 65/21.4; 106/75; 428/406
[58] Field of Search ............ 65/21.4, 22, 18.1; 106/75, 86, 88, 122; 264/14, 15, 13, 50, 42; 427/213.31, 213.32; 428/405, 406; 501/84, 39, 65, 77

[56] References Cited

U.S. PATENT DOCUMENTS

| | | | |
|---|---|---|---|
| 2,797,201 | 6/1957 | Veatch | 106/86 |
| 2,978,340 | 4/1961 | Veatch | 106/75 |
| 3,030,215 | 4/1962 | Veatch | 501/33 |
| 3,699,050 | 10/1972 | Henderson | 106/75 |
| 3,794,503 | 2/1974 | Netting | 106/75 |
| 3,960,583 | 6/1976 | Netting | 106/168 |
| 4,132,560 | 1/1979 | Marquisee | 106/293 |
| 4,173,491 | 11/1979 | Abrams | 106/288 B |
| 4,340,642 | 7/1982 | Netting et al. | 428/402 |

*Primary Examiner*—T. M. Tufariello
*Attorney, Agent, or Firm*—Scully, Scott, Murphy and Presser

[57] ABSTRACT

This invention relates to a process for producing a hollow microsphere wherein the inner portion of the shell of which comprises the reaction product of a silicate and a first insolubilizing agent, the outer portion of the shell of which comprises the reaction product of a silicate and a second insolubilizing agent and wherein the equivalent ratio of silicate to, respectively, the first and second insolubilizing agent is less in respect of said inner portion than said outer portion.

17 Claims, 2 Drawing Figures

PROCESS FOR PRODUCING HOLLOW, BILAYERED SILICATE MICROSPHERES

This invention relates to a material. In a particular aspect this invention relates to hollow microspheres.

It is known to make hollow microspheres by the process of U.S. Pat. No. 3,796,777, the prior art disclosed therein, and U.S. Pat. Nos. 2,797,201; 2,978,340; 3,030,215 and 3,699,050.

However, various of the prior art processes have difficulties such as producing ammonia as a pollutant.

The present invention provides a hollow microsphere wherein the inner portion of the shell of which comprises the reaction product of a silicate and a first insolubilizing agent, the outer portion of the shell of which comprises the reaction product of a silicate and a second insolubilizing agent and wherein the equivalent ratio of silicate to, respectively, the first and second insolublizing agent is less in respect of said inner portion than said outer portion.

Preferably the silicate is selected from the group consisting of sodium and potassium silicate.

Preferably the first insolubilizing agent is a weak acid.

Preferably the weak acid is selected from the group consisting of boric and phosphoric acid.

Preferably the second insolubilizing agent is selected from the group consisting of weak acids and salts capable of reacting with the silicate to form an insoluble reaction product.

Preferably said salts are selected from the group consisting of calcium salts, magnesium salts, aluminium salts and salts of polyvalent metals capable of reacting with the silicate to form an insoluble reaction product.

Preferably the second insolubilizing agent is selected from the group consisting of boric and phosphoric acid.

In one instance the second insolubilizing agent is different to the first insolubilizing agent.

Preferably the first and the second insolubilizing agents are the same.

Preferably the equivalent ratio of the silicate to the first insolubilizing agent in the inner portion is such that unreacted silicate remains therein.

Preferably the equivalent ratio of the silicate to the second insolubilizing agent in the outer portion is such that substantially no unreacted silicate remains therein.

Preferably the second insolubilizing agent is present in said shell to a depth of not more than 50% thereof or, more preferably, not more than 25%.

Preferably the silicate is sodium silicate, wherein the first and second insolubilizing agents are both boric acid and wherein the weight ratio of silicate to second insolubilizing agent in the outer portion, expressed as $Na_2O:B_2O_3$, is from 1.6-3:1 preferably 1.8-2.4:1 and most preferably about 2:1.

Preferably said shell contains an hydroxylated and/or an oxygenated organic compound.

Preferably said compound is ethylene glycol diacetate

Preferably the microspheres have an effective density of 0.18-0.21 gm/cc, a size of 10-200 micron, a shell wall thickness of 1-2 micron and a crush resistance of 150-1500 psi.

Preferably the microspheres have a silane or a siloxane on the surface thereof.

The present invention also provides a process for producing hollow microspheres comprising forming a feedstock containing water, a silicate and a first insolubilizing agent, spray drying the feedstock to form hollow microspheres and applying to the hollow microspheres so formed a second insolubilizing agent whereby to produce hollow microspheres the inner portion of the shell of which comprises the reaction product of the silicate and the first insolubilizing agent, the outer portion of which comprises the reaction product of the silicate and the second insolubilizing agent and wherein the equivalent ratio of silicate to, respectively the first and second insolubilizing agent is less in respect of said inner surface than said outer portion.

In a preferred aspect the present invention provides a process for producing hollow microspheres comprising (a) mixing together an aqueous solution (i) containing a silicate and an aqueous solution (ii) containing a first insolubilizing agent to form a feedstock, (b) forming the feedstock into droplets and drying the droplets to form hollow microspheres, and (c) applying to the droplets and/or the microspheres so formed an aqueous solution (iii) of a second insolubilizing agent whereby to produce hollow microspheres the inner portion of the shell of which comprises the reaction product of the silicate and the first insolubilizing agent, the outer portion of which comprises the reaction product of the silicate and the second insolubilizing agent and wherein the equivalent ratio of silicate to, respectively the first and second insolubilizing agent is less in respect of said inner portion than said outer portion.

Solutions of alkali metal silicate are useful in the process of our invention. Alkali metal silicate solutions are well known articles of commerce usually prepared by dissolving the glass that results from the fusion of a source of alkali metal and sand. Such solutions can also be prepared by dissolving silica in an alkali metal hydroxide. Useful silicate solutions contain about 1.5 to 4.0 moles of $SiO_2$ per mole of $M_2O$ and 25 to 55% w/w of solids wherein M stands for an alkali metal. We prefer to use sodium or potassium silicate that contains 1.7 to 3.5 moles of $SiO_2$ per mole of $Na_2O$ or $K_2O$, more preferably 2.0-3.2 moles of $SiO_2$ per mole of $Na_2O$ or $K_2O$.

The potassium or sodium silicate is preferably present in solution (i) as 25-55% by weight with about 40% by weight being more preferred.

Solution (i) is preferably delivered to the mixing step (a) at a temperature of from 5° to 80° C. with 20°-60° C. being more preferred and 30°-40° C. being most preferred.

Boric acid is preferably present in solution (ii), as 3-20% by weight with 6-12% being more preferred. Solution (ii) is preferably delivered to the mixing step (a) at a temperature of from 10°-90° C. with 40°-70° C. being more preferred and 50°-60° C. being most preferred.

It is preferred to add a solution, (iv) to solution (ii) prior to mixing step (a) and that addition preferably occurs immediately before mixing step (a).

The insolubilizing agent can be any acid which when added to a silicate solution forms a relatively stable solution that can be spray dried to form a hollow microsphere; said microsphere having a solubility in water that is substantially reduced from that of the starting silicate. These insolubilizing agents include weak acids such as boric acid or phosphoric acid. We prefer boric acid. In some embodiments of our invention the insolubilizing agent sprayed onto the surface of the formed hollow microspheres or its precursor droplets can be different from that utilized in the bulk of the microsphere shell. These agents which can be sprayed as solutions onto the droplets or microspheres at any time after they are formed can include boric acid, phosphoric acid, calcium salts, magnesium salts, and aluminium salts, among other polyvalent metal salts that react to form insoluble reaction products with silicates.

Another preferred embodiment of our invention involves the addition of a water-miscible, high-molecular-weight organic compound to the feedstock to be spray dried. Such organic compounds are desirably stable in highly alkaline systems and not cause the silicate to gel. In general, organic compounds that contain a number of hydroxyl groups and/or exposed oxygens are useful. Examples of useful materials include cellosolve, ethyl cellosolve, ethylene glycol, and ethylene glycol diacetate (EGDA). We prefer to use EGDA.

Solution (iv) preferably contains ethylene glycol diacetate (EGDA) and solution (iv) may be 100% composed of EGDA.

Solution (iv) is preferably added to solution (ii) in the ratio range 100:0.1–100:3 with 100:0.5–100:2.0 being most preferred.

The ratio range of solution (i) to solution (ii) is preferably 100:40–100:200 with 100:60–100:110 being more preferred.

Mixing step (a) should preferably be undertaken with considerable care to avoid undesirable formation of gel.

Applicants recommend that mixing step (a) be performed using a high shearing mixer. As an example, for a mixing process using a 1000 liter mixing vessel a mixer was used having a primary disc of 75 mm diameter and a secondary disc of 225 mm diameter both driven on a single shaft at 3000 rpm by a 10 HP motor and with a disc immersion depth of 640 mm.

The feedstock is preferably held for 1–2 hours after mixing step (a) but it is preferred that it is not held for more than 4 hours.

The feedstock is preferably held at 5°–80° C. with 10°–40° C. being most preferred.

The feedstock preferably has a viscosity of 10–200 centipoise with 20–150 centipoise being more preferred. Vicosity was measured using a Brookfield RT Spindle No. 1 at 100 rpm viscometer.

The drying of the droplets is preferably conducted in a chamber after spraying the feedstock into small droplets. Such spraying may be done by impinging the feedstock onto a rapidly spinning disc but is preferably done by passing the feedstock through one or more spray nozzles.

To dry the droplets hot air is preferably passed into the chamber at a temperature and in an amount sufficient to effect drying. In general it is preferred that the hot air inlets at 100°–500° C. with 200°–300° C. being more preferred, and exits at 60°–160° C., more preferably 80°–120° C.

The hot air is preferably directed to introduce substantial turbulence in the stream of droplets as this can help in avoidance of localized overheating and particle marriage.

After spray drying the particles formed may be further dried. Such further drying is preferably achieved in an oven at a preferred temperature of from 80°–140° C., more preferably 90°–110° C. at a particle inlet, and 120°–250° C., more preferably 150°–200° C. at a particle outlet. A preferred oven is a rotating kiln. A preferred residence time for particles in the oven is 10–80 minutes; more preferably 20–30 minutes.

After further drying, if that operation is performed, the particles are preferably coated with siloxane or silane using a solvent such as methylene chloride and preferably by spraying. The coating is preferably carried out in a mixer at 80°–200° C. with 120°–150° C. being more preferred, and with a preferred residence time of 10–60 minutes, more preferably 20–60 minutes.

The particles may be given a surface treatment in a mixer by building up temperature from a starting point of 80°–200° C., more preferably 120°–150° C., to 150°–300° C. more preferably 200°–250° C. That surface treatment is preferably performed over a period of at least 10 minutes.

The application of solution (iii) preferably occurs immediately after formation of the droplets and preferably before completion of drying thereof but may occur later such as during the further drying referred to above or later.

We have found it to be chemically most efficient to apply solution (iii) to the droplets but energy most efficient if it is applied in the further drying.

Solution (iii) is preferably applied by spraying. A suitable solution for spraying has substantially the same composition as solution (ii) and additionally preferably contains EGDA but may have a higher concentration of boric acid and/or EGDA. Such a solution is preferably applied in the weight ratio range to the feedstock of 2:100–50:100 more preferably 10:100–30:100.

Solution (iii) applied during the spray drying should preferably by applied under conditions avoiding flash evaporation. Flash evaporation problems can be reduced if solution (iii) is sprayed in close proximity to the initiation of the spray of droplets. Alternatively, by introducing solution (iii) into a relatively cool region of the spray drying step flash evaporation may be reduced.

Figure 2:
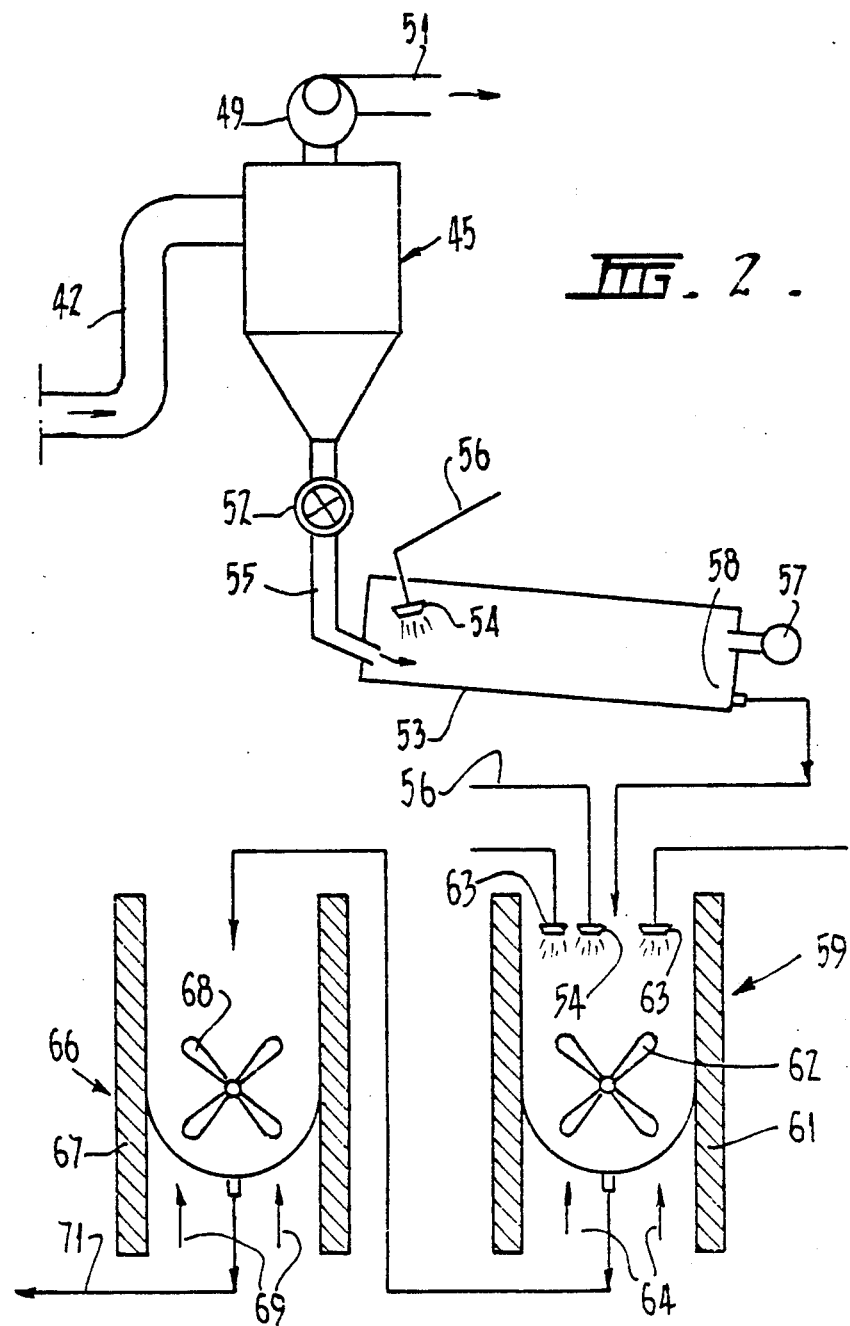

A construction of preferred apparatus useful in performing the method of this invention and its manner of use will now be described with the aid of the accompanying drawings in which:

FIGS. 1 and 2 are schematic representations of the apparatus.

FIGS. 1 and 2 should be viewed together with FIG. 1 on the left and FIG. 2 on the right.

The apparatus as described below is suitable for production of 10–50 kg of product per hour. If a larger or smaller plant is required, sizes given should be adjusted.

The apparatus includes a 1000 liter first mixing tank 1 for initially containing a solution (I) containing a potassium or sodium silicate and a 1000 liter second mixing tank 2 for initially containing a solution (II) containing boric acid.

Tanks 1 and 2 are provided with stirrers 21 and 22 and tank 1 is provided with a high shear stirrer 23.

In use a solution (III) consisting of EGDA is added to tank 2 and tank 2 is used to feed its contents via line 24 to tank 1 while mixing with the high shear stirrer 23.

Tanks 1 and 2 are provided with heating jackets 26 and 27.

The contents of tank 1, feedstock, after mixing are carried by line 28 to a 1000 liter third tank 29 where they are held until required. Tank 29 has a heating jacket 30 and a mixer 25.

From tank 29 the feedstock is delivered by lines 31 and 32 via a high pressure pump 33 regulator 35 and a gauge 34 to a spray drier 36.

The spray drier 36 comprises a cylindrical portion 37 of 3300 mm height and 2100 mm diameter, a top frusto-cone 38 of 200 mm height and a bottom frusto-cone 39 of 1210 mm height.

The spray drier 36 also includes an air inlet 41, an air and particle outlet 42, a swirl chamber 43 in which entering air is caused to swirl by means of a scroll 44 and a descending tube 46. The chamber 43 has a height of 500 mm and a diameter 40% of that of the cylindrical portion 37. The tube 46 has a length of 700 mm.

Line 32 is connected to a spray nozzle head 47 (alternatively the head 47 may be replaced by a rotary disc atomizer or a spray head having additional side exit nozzles). An additional spray nozzle head 48 and supply line 50 therefor is optionally positioned in the spray drier 36.

The outlet 42 of the spray drier 36 is connected to a cyclone 45 which has a fan 49, an air outlet 51 which passes to a dust collector (not shown) a rotary valve 52 and an outlet line 55 to a rotary kiln 53.

The kiln 53 has a spray nozzle head 54 and supply line 56 therefor and a heater 57 for blowing hot air into the kiln. The head 54 and line 56 are optional.

Particles exit from the kiln 53 at 58 and are passed to a first surface treatment mixer 59.

The mixer 59 has insulation 61, paddles 62, and spray nozzles 63 through which siloxane or silane is sprayed. A heat source, not shown, is used to supply heat as indicated by arrows 64. An alternative position for spray nozzle head 54 is in mixer 59 (kiln 53 or spray drier 36).

After treatment in the mixer 59 particles are passed to a second surface treatment mixer 66.

Mixer 66 has insulation 67 and paddles 68. A heat source, not shown, is used to supply heat as indicated by arrows 69.

After treatment in the mixer 66 particles are passed to screening and bagging apparatus indicated by 71.

The present invention will be further illustrated by the following Examples. In the Examples, all parts are by weight unless otherwise specified.

EXAMPLE I

A solution (I) of 440 parts of sodium silicate NA45 were heated to 35° C. in tank 1.

NA45 is a sodium silicate produced by ICI Australia. It has an Intermediate classification, sodium silicate of mean weight ratio $SiO_2:Na_2O$ of 2.75:1 and has a typical analysis of % by weight of 10.8 $Na_2O$, 29.7 $SiO_2$ and 40.5 solids. It has a specific gravity of 1.45 and a typical viscosity of 200 cp at 20° C.

A solution (II) of 350 parts water, 31 parts boric acid and 2.2 parts by weight EDGA were dissolved and blended in tank 2 and heated to 60° C.

20 parts of solution (II) were fed to tank 1 under high shear mixing conditions at a rate of 2 parts per minute. A further 326 parts of solution (II) were fed to tank 1 under the same mixing conditions at a rate of 8 parts per minute. The final 37.5 parts of solution (II) were then fed to tank 1 at a rate of 2 parts per minute.

Mixing was maintained in tank 1 for a further 5 minutes and the resultant feedstock was then pumped to tank 29 where it was cooled to 20° C.

The feedstock was then pumped at 1500 psi to the spray nozzle head 47. Spray nozzle head 47 had three orifices of size 0.020 inch with flat top cores with two grooves of 0.016 inch width and 0.024 inch depth.

The air temperature at the spray drier air inlet 41 was 350° C. and at the outlet 42 was 105° C.

In the spray drier the spray nozzle head 48 was supplied at 750–10000 psi with a 60° C. solution (III) containing 8.8 parts boric acid, 100 parts water and 0.62 parts EGDA.

The product exiting from the outlet 42 was hollow spherical particles and those particles were fed via the cyclone 45 to the kiln 53.

The kiln 53 was maintained at 90° C. at the particle inlet and 195° C. at the particle outlet.

Particles exiting from the kiln 53 were passed to the mixer 59 and sprayed with a 6.67% by weight solution of Dow Corning 1107 Siloxane in ethylene chloride while applying heat.

Particles were then passed from the mixer 59 to the mixer 66 where the temperature was built up to 250° C. for 30 minutes.

The particles were then screened through an 80 mesh sieve and packed.

The particles obtained by the above process were microspheres which were clean, hollow, free flowing, moisture resistant, effective particle density of 0.18–0.21 gm/cc. The particles ranged in size from 10–200 micron and had a wall thickness of 1–2 micron. Crush resistance was in the range 150–1500 psi.

By ranging the conditions microspheres having higher density or different wall thickness can be obtained.

The particles were suitable for use as a high volume extender for resins and binders and in plastics mouldings to produce low density finished products.

EXAMPLE II

Example I was repeated excepting that the spray nozzle head 48 was not used and in lieu the spray nozzle head 54 was used to spray the 60° C. solution containing 8.8 parts boric acid, 100 parts water and 0.62 parts EGDA.

Results obtained were satisfactory and although the particles were not of as good quality significant heat saving in spray drier 36 was achieved.

EXAMPLE III

Example I was repeated excepting that solution (III) was replaced (a) entirely by an equivalent amount of phosphoric acid, (b) in part and entirely by (i) aluminium salts, (ii) calcium salts and (iii) magnesium salts and (c) partly by phosphoric acid.

Satisfactory particles were obtained.

As will be seen from the above Examples, the present invention is capable of producing good quality microspheres without ammonia emission, without a fusing step and in small quantity although our experiments indicate that large quantity production is also possible.

We claim:

1. A process for producing hollow microspheres comprising
    (a) mixing together an aqueous solution (i) containing a silicate and an aqueous solution (ii) containing a first insolubilizing agent to form a feedstock,
    (b) forming the feedstock into droplets
    (c) spray drying the droplets to form hollow microspheres, and
    (d) applying to the droplets during the spray drying, an aqueous solution (iii) of a second insolubilizing agent to produce hollow microspheres the inner portion of the shell of which comprises the reaction product of the silicate and the first insolubilizing agent, the outer portion of which comprises the reaction product of the silicate and the second insolubilizing agent and wherein the equivalent ratio of silicate to, respectively the first and second insolubilizing agent is less in respect of said inner portion than said outer portion.

2. A process for producing hollow microspheres as claimed in claim 1, wherein the silicate is selected from the group consisting of sodium or potassium silicate.

3. A process for producing hollow microspheres as claimed in claim 1, wherein the first insolubilizing agent is a weak acid.

4. A process for producing hollow microspheres as claimed in claim 1, wherein the first insolubilizing agent is selected from the group consisting of boric or phosphoric acid.

5. A process for producing hollow microspheres as claimed in claim 1 wherein the second insolubilizing agent is selected from the group consisting of weak acids and salts capable of reacting with the silicate to form an insoluble reaction product.

6. A process for producing hollow microspheres as claimed in claim 5, wherein said salts are selected from the group consisting of calcium salts, magnesium salts, aluminium salts and salts of polyvalent metals capable of reacting with the silicate to form an insoluble reaction product.

7. A process for producing hollow microspheres as claimed in, claim 5, wherein the second insolubilizing agent is selected from the group consisting of boric and phosphoric acid.

8. A process for producing hollow microspheres as claimed in claim 1 wherein the second insolubilizing agent is different to the first insolubilzing agent.

9. A process for producing hollow microspheres as claimed in claim 1, wherein the first and the second insolubilizing agents are the same.

10. A process for producing hollow microspheres as claimed in claim 9, wherein the first and the second insolubilizing agents are both boric acid.

11. A process for producing hollow microspheres as claimed in claim 10, wherein potassium or sodium silicate is present in solution (i) as 25-55% by weight.

12. A process for producing hollow microspheres as claimed in claim 10, wherein boric acid is present in solution (ii) as 3-20% by weight.

13. A process for producing hollow microspheres as claimed in claim 10, wherein a solution (iv) containing an hydroxylated and/or an oxygenated organic compound is added to solution (ii) prior to mixing step (a).

14. A process for producing hollow microspheres as claimed in claim 13, wherein the organic compound is ethylene glycol diacetate.

15. A process for producing hollow microspheres as claimed in claim 10, wherein the feedstock is held for 1-2 hours after mixing step (a) prior to step (b).

16. A process for producing hollow microspheres as claimed in claim 1, wherein solution (iii) is applied to the droplets by being sprayed in close proximity to the initiation of the spray of droplets.

17. A proces for producing hollow microspheres as claimed in claim 15, wherein solution (iii) additionally contains EGDA.

* * * * *